United States Patent
Kirschner et al.

(10) Patent No.: US 8,643,210 B2
(45) Date of Patent: Feb. 4, 2014

(54) METHOD AND DEVICE FOR SUPPLYING OPERATING VOLTAGE TO A CONTROL UNIT OF A MOTOR VEHICLE

(75) Inventors: Manfred Kirschner, Stuttgart (DE); Dieter Buchholz, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 12/497,079

(22) Filed: Jul. 2, 2009

(65) Prior Publication Data

US 2010/0019571 A1 Jan. 28, 2010

(30) Foreign Application Priority Data

Jul. 18, 2008 (DE) .......................... 10 2008 040 547

(51) Int. Cl.
*B60L 1/00* (2006.01)

(52) U.S. Cl.
USPC .......................................... 307/9.1; 307/10.1

(58) Field of Classification Search
USPC ................................................ 307/10.1, 9.1
See application file for complete search history.

(56) References Cited

U.S. PATENT DOCUMENTS

| | | | | |
|---|---|---|---|---|
| 6,046,512 A * | 4/2000 | Heise | ........................... | 307/10.1 |
| 7,154,194 B2 * | 12/2006 | Sayama | ......................... | 307/43 |
| 7,235,898 B1 * | 6/2007 | Jones et al. | .................... | 307/9.1 |
| 7,329,967 B2 * | 2/2008 | Nozawa et al. | .............. | 307/10.7 |
| 7,851,939 B2 * | 12/2010 | Degoul et al. | ................ | 307/10.1 |
| 2004/0124705 A1 | 7/2004 | Nozawa et al. | | |
| 2005/0035656 A1 * | 2/2005 | Kuramochi et al. | ......... | 307/10.1 |
| 2005/0052081 A1 | 3/2005 | Sayama | | |
| 2005/0200202 A1 * | 9/2005 | Mihara | ........................ | 307/10.1 |

FOREIGN PATENT DOCUMENTS

| | | |
|---|---|---|
| CN | 2719639 | 8/2005 |
| CN | 101171656 | 4/2008 |
| DE | 10 2004 023 252 | 4/2005 |

* cited by examiner

*Primary Examiner* — Jared Fureman
*Assistant Examiner* — Alfonso Perez Borroto
(74) *Attorney, Agent, or Firm* — Kenyon & Kenyon LLP

(57) ABSTRACT

A method for supplying operating voltage to a control unit of a motor vehicle, the control unit being continuously supplied by a vehicle battery, and a device for implementing the method. In the case of a method for supplying a control unit of a motor vehicle with operating voltage, where the power supply to the control unit is reliably ensured in the off and non-running state, respectively, during vehicle start-up, while entailing minimal outlay for circuitry, a potential of the vehicle battery is connected to the control unit at all times via at least one of the lines that are connected to the control unit.

10 Claims, 2 Drawing Sheets

METHOD AND DEVICE FOR SUPPLYING OPERATING VOLTAGE TO A CONTROL UNIT OF A MOTOR VEHICLE

FIELD OF THE INVENTION

The present invention relates to a method for supplying operating voltage to a control unit of a motor vehicle, the control unit being continuously supplied by a vehicle battery, and to a device for implementing the method.

BACKGROUND INFORMATION

The operation of engine control units, which are used for controlling combustion engines, requires electric power which is generated by an electric generator that is likewise driven by the combustion engine. When the engine is not running or at vehicle start-up, a vehicle battery must supply the power, which is why the engine control unit is electrically connected to a vehicle battery.

Moreover, the engine control unit must maintain specific functionalities of the vehicle electronics, even in the case of a parked vehicle. These include, inter alia, the operation of an elapsed-time meter for monitoring the time that has elapsed since the last engine operation cutoff, or the maintaining of a wake-up function by a data bus, in which case another control unit transmits a pulse via a communication line to the engine control unit, thereby switching it on. Continually supplied memories within the vehicle electronics also require a permanent connection of the engine control unit to the vehicle battery since their data can be lost when the engine control unit is switched off.

From German Patent Application No. DE 10 2004 023 252, a power supply circuit for a vehicle electronic control unit is known which has a constant-voltage power supply circuit that is supplied with power from the vehicle battery and that carries a predetermined, controlled voltage to a microprocessor of the vehicle electronic control unit, thereby continuously supplying it with power. The constant-voltage power supply circuit is connected in a switched operation via a plurality of intermediate-voltage circuits which are used for separating the various operating states of the vehicle electronic control unit, respectively of the vehicle.

SUMMARY OF THE INVENTION

An object of the present invention is to provide a method and a device for supplying a control unit of a motor vehicle with operating voltage which will allow the power supply to the control unit to be reliably ensured even during the off state, respectively, during vehicle start-up, while entailing minimal outlay for circuitry.

The objective is achieved in accordance with the present invention in that a potential of the vehicle battery is connected to the control unit at all times via a line that is only intermittently connected to the control unit.

At least three lines are provided that connect the control unit to the vehicle battery at different points in time. These are terminal 15, the battery via the main relay (UBHR), and the main relay (HR).

The voltages at terminal 15, at the battery via the main relay, and at the main relay are realized in such a way that one line always has battery voltage potential, regardless of whether the signals are switched directly to the battery voltage or whether the potential of the vehicle battery is received via the relay.

Thus, the need for an additional line to permanently connect the vehicle battery to the control unit may be eliminated. Besides the additional line, the need for a fuse and a connector pin is also eliminated. There is no need for a distinction to be made in terms of hardware between the switched and continuous variant of the various voltage concepts, since all vehicle electrical systems recognize when the vehicle battery is disconnected.

By omitting the process of continually supplying the control unit, the outlay for reverse-polarity protection is eliminated, as is the wiring for the additional line. The need for measures for reducing the electromagnetic compatibility and the electrostatic discharging may be eliminated. The quiescent current consumption of the vehicle battery is thereby reduced or at least not affected.

In one embodiment of the present invention, the various lines of the control unit are interconnected in a predefined sequence to the vehicle battery by components that connect the control unit to the vehicle battery's potential at the point in time of the interconnection.

An advantage is derived in that the need for a dual voltage supply (continuous and switched) is eliminated since it is no longer necessary to distinguish between continuously supplied vehicle systems, such as systems having memories, respectively, elapsed-time meters for monitoring the time since the last cutoff, and non-continuously supplied systems; rather only a switched voltage supply still needs to be maintained.

During engine startup, the control unit is advantageously connected to the vehicle battery via an ignition lock, given an activated relay. Thus, the ignition lock is connected, on the one hand, to the vehicle battery and, on the other hand, to terminal 15 of the control unit. In response to actuation of the ignition lock, terminal 15 and thus the control unit are connected to the potential of the vehicle battery. Moreover, the relay is energized by the ignition lock (terminal 15).

In another embodiment of the present invention, a relay is deactivated following switch-off of the ignition lock; in the deactivated state, the control unit connecting the relay to the potential of the vehicle battery.

The control unit is brought into circuit via the relay (also referred to as main relay), which is designed as a power relay and is connected to the battery voltage when the power relay is deactivated. When the power relay is active, there is a connection between the potential of the vehicle battery and the battery voltage via the main relay.

In another embodiment of the present invention, in the case of a device for supplying operating voltage to a control unit of a motor vehicle, the control unit being continuously supplied by a vehicle battery, means are provided for continuously supplying voltage to the control unit that, in different control unit phases, connect at least one of the lines connected to the control unit to the potential of the vehicle battery. In the case of an engine control unit, these means are incorporated in the ignition lock and the main relay. These means are provided in the vehicle. Thus, no further structural components are needed to provide a switched voltage supply to the control unit. The ignition lock and the main relay are switched in temporal succession, so that no interruption whatsover occurs in the connection between the control unit and the vehicle battery, and thus a quasi continuous voltage supply to the control unit is maintained.

In a further refinement of the present invention, an internal voltage supply to the control unit is connected to the lines leading to the control unit. The internal voltage supply is continuously supplied with power via the lines that carry the potential of the vehicle battery.

To prevent the control unit from being destroyed by an improper connection of the vehicle battery to the control unit, every line is routed via a reverse-polarity protection device, located in the control unit, to the internal voltage supply of the control unit. This type of reverse-polarity protection device may be realized inexpensively since merely one diode is required for each line that is configured between the input of the control unit and the internal voltage supply.

In another embodiment of the present invention, the control unit is connected to a data bus that brings the control unit into circuit. The connection is established via a communication line that only carries low voltage. Since this voltage does not suffice for the control unit's internal voltage supply, an energy accumulator is located between the control unit's internal voltage supply and ground to allow the data bus to bring the control unit into circuit. This energy accumulator is charged through the external lines that are connected to the vehicle battery and is provided to increase the voltage signal of the data bus in order to supply sufficient energy to the internal voltage supply.

The energy accumulator is very easily implemented when it is designed as a capacitor. Thus, inexpensive components contribute to the continuous supplying of the control unit with an operating voltage.

DETAILED DESCRIPTION

Figure 1:
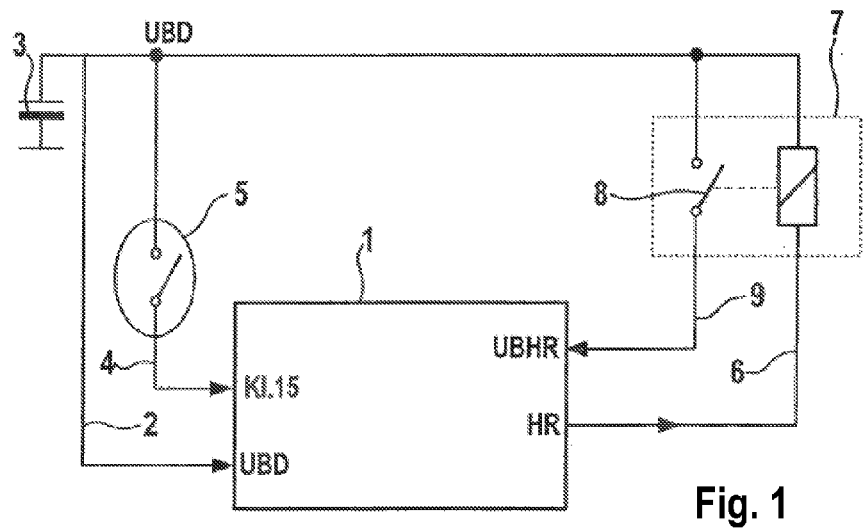
FIG. 1 shows a schematic diagram of the interconnection of an engine control unit in a related-art vehicle.

FIG. 1 shows the interconnection of an engine control unit in accordance with the related art. Engine control unit 1 is connected via a line 2 directly to vehicle battery 3. Thus, a voltage potential UBD of vehicle battery 3 is permanently present at the input in question of engine control unit 1. Connected via a line 4 at another input of engine control unit 1, which is designated as terminal 15, is an end of an ignition lock 5, whose second end is likewise connected to potential UBD of vehicle battery 3. Vehicle battery 3 is connected via line 6 to a main relay 7 which leads to input HR of the engine control unit. In the closed state, switch 8 of main relay 7 connects the vehicle battery via line 9 to fourth input UBHR of engine control unit 1.

At the same time, the designations for inputs HR and UBHR of the engine control unit denote the circuit state. Thus, HR signifies the main relay and UBHR the battery voltage across the main relay. UBD is to be equated with the battery voltage in a continuous operation.

As is inferable from this representation, engine control unit 1 is not only continuously connected via line 2 to the potential of vehicle battery 3, but intermittently also via lines 3, 6 and 9. This leads to a dual supplying of voltage to engine control unit 1.

Figure 2:
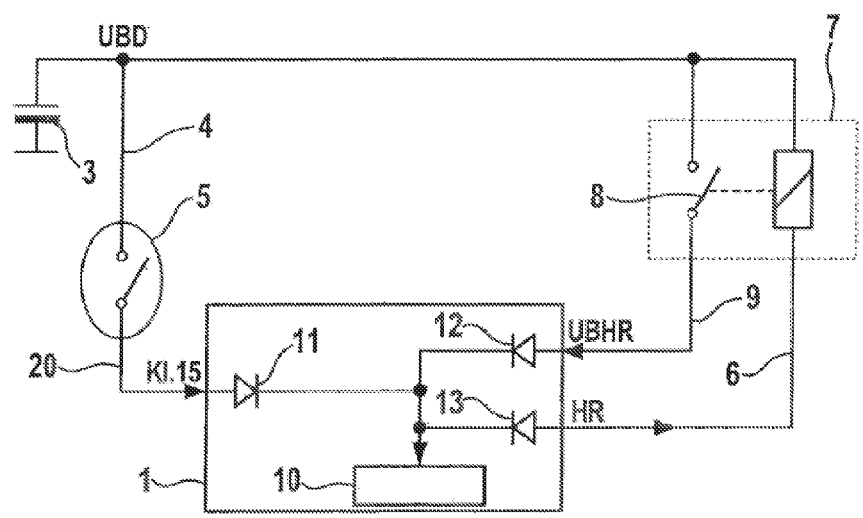
FIG. 2 shows the external and internal interconnections of the engine control unit in accordance with a first exemplary embodiment.

As is apparent from FIG. 2, the need for line 2 and, thus, for the continuous connection of engine control unit 1 to vehicle battery 3 is eliminated in the first exemplary embodiment. In this variant, comparably to FIG. 1, ignition lock 5 and main relay 7, inclusive of switch 8 thereof, are connected via lines 20, 6 and 9 to the potential of vehicle battery 3.

Located within control unit 1 is an internal voltage supply 10 for engine control unit 1 that is connected to inputs, terminal 15, HR and UBHR, of engine control unit 1. Configured between input terminal 15 and internal voltage supply 10 is a diode 11. In addition, a diode 12 is located between input UBHR and internal voltage supply 10, as well as one further diode 13 between input HR and internal voltage supply 10. All of the diodes 11, 12, and 13 serve the purpose of reverse-polarity protection, decoupling of the signals, and of preventing a reverse discharging through the capacitor at internal voltage supply 10. Diodes 11, 12 and 13 are interconnected in parallel. They lead directly to internal voltage supply 10.

Figure 3:
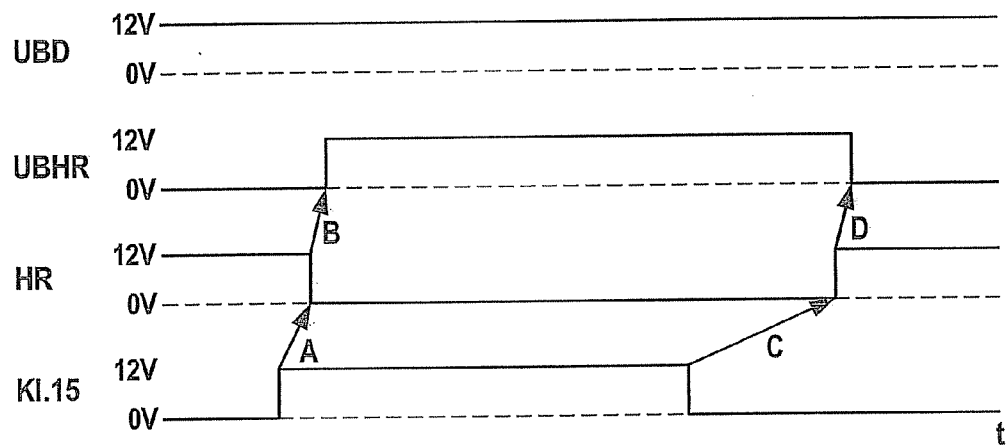
FIG. 3 shows a representation of the voltage curve across the engine control unit in accordance with the exemplary embodiment according to FIG. 2.

Due to these interconnections, engine control unit 1 is, in fact, switched back and forth between lines 20, 6 and 9 at various points in time, as proceeds from FIG. 3; however, a potential of vehicle battery 3 is present at all times at engine control unit 1. The voltage curves present across individual inputs, terminal 15, HR and UBHR, of engine control unit 1 are represented only schematically in FIG. 3 as a function of time t and do not represent any electrical signals. In this case, the potential of vehicle battery 3 is characterized as 12 V.

If ignition lock 5 is switched off, a potential of 0 V is present at terminal 15. At the same point in time, switched-off main relay 7 is connected via line 6 to vehicle battery 3, and input HR of the engine control unit is present at the potential of vehicle battery 3. Input UBHR is likewise at 0 V since main relay 7 is deactivated and switch 8 is thus open.

If the ignition lock is now actuated at point A of FIG. 3, which is synonymous with the ignition switch being closed and battery potential UBD being present at terminal 15, main relay 7 switches itself on in response to the debouncing of the control signal. This means that switch 8 of main relay 7 is closed and, accordingly, the potential of the vehicle battery is present at input UBHR after a time delay due to the mechanical pickup time of the relay, input HR switching from 12 V to 0 V (point B).

A comparable voltage curve is observed when the ignition switch is switched off at point C. In this context, the ignition switch of ignition lock 5 is opened, and the potential present at terminal 15 drops from 12 V battery voltage to 0 V. Thus, no voltage is present at terminal 15. This procedure causes the main relay to be deactivated in response to the debouncing of the control signal. However, this deactivation first takes place upon the elapsing of a software-induced lag in the control unit, for example, for completing memory processes or diagnostics. At this point, input HR of the engine control unit is again connected to operating voltage UBHR since the main relay is connected via line 6 to vehicle battery 3. At point D, main relay 7 drops out after a time delay due to its mechanical drop-out time, switch 8 being opened and the main relay being switched off. At this point in time, input UBHR is again at 0 V.

Figure 4:
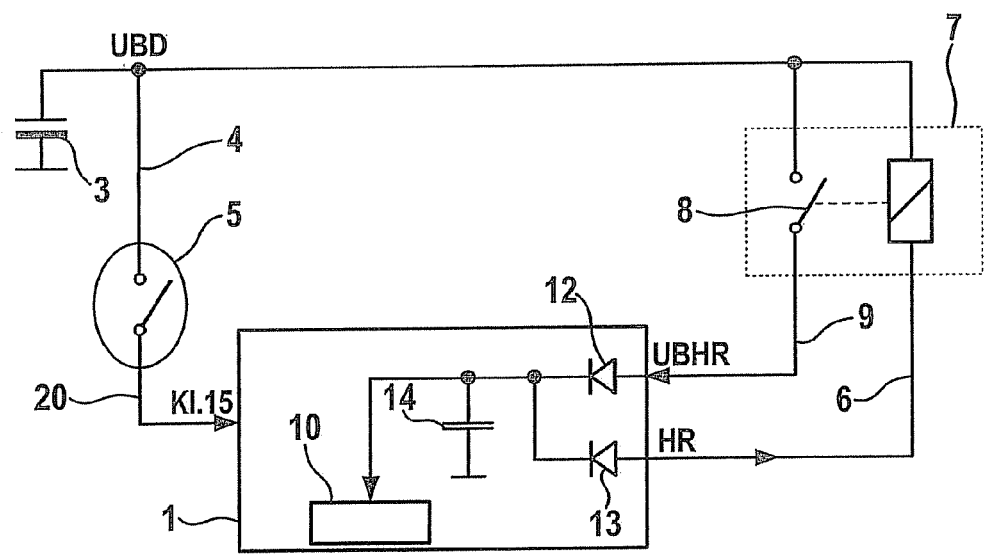
FIG. 4 shows the external and internal interconnections of the engine control unit in accordance with a second exemplary embodiment.

FIG. 4 illustrates one possible further refinement of the present invention. In this case, engine control unit 1 is connected to a communication line of a data bus (not shown in detail), which may be designed as a CAN bus, FlexRay or LIN bus. A switch-on pulse for engine control unit 1, that was initiated by another control unit, is transmitted on the data bus. The data bus is relatively high-ohmic and, therefore, only has a voltage level of a few volts. In particular, a voltage of only 1 volt is available for a wakeup function. This does not suffice for internal voltage supply 10 of engine control unit 1.

In accordance with FIG. 4, inputs UBHR and HR of the engine control unit are connected to diodes 12 and 13 which lead to internal voltage supply 10. A capacitor 14 is connected to ground in parallel with diodes 12 and 13. Capacitor 14 bridges the mechanical pickup time of main relay 7, since, at this point in time, no voltage is supplied by the data bus. Due to the low current consumption of the internal circuit of engine control unit 1 of an estimated 1 mA and a mechanical pickup time of main relay 7 of 5 ms, a capacitor 14 having a capacitance of 1 µF seems sufficient for maintaining the energy supply for this short period of time.

By employing the approaches in accordance with the present invention, not only is the need eliminated for the continuous plus connection, but a voltage supply is ensured for a broad array of functionalities in the engine control unit.

The principle elucidated here is not only suited for the engine control unit, but may also be applied to other control units used in motor vehicles, such as transmission control units or ABS control units.

What is claimed is:

1. A method for supplying an operating voltage to a control unit of a motor vehicle, the method comprising:
    continuously supplying voltage to the control unit by a vehicle battery only via a plurality of lines;
    wherein, for the continuous supply of voltage, a connection of a potential of the vehicle battery to the control unit is switched, during the continuous supply, between different ones of the plurality of lines in dependence upon transitions between a plurality of predefined fault-free operation phases, such that, during the continuous supply, each of the plurality of lines:
        carries the potential for the connection of the carried potential to the control unit in one or more respective ones of the predefined fault-free operation phases; and
        does not carry any of the potential during one or more other respective ones of the predefined fault-free operation phases.

2. The method according to claim 1, wherein various lines of the control unit are interconnected in a predefined sequence to the vehicle battery by components that connect the control unit to the potential of the vehicle battery at a point in time of the interconnection.

3. The method according to claim 2, wherein, during engine startup, the control unit is connected to the vehicle battery via an ignition lock, given an activated relay.

4. The method according to claim 3, wherein the relay is deactivated following switch-off of the ignition lock and wherein, in a deactivated state, the control unit connects the relay to the potential of the vehicle battery.

5. An arrangement for supplying an operating voltage to a control unit of a motor vehicle, comprising:
    a plurality of lines for continuously supplying voltage to the control unit; and
    a vehicle battery;
    wherein the arrangement is configured to:
        supply the voltage only via the plurality of lines; and
        for the continuous supply of voltage, switch a connection of a potential of the vehicle battery to the control unit, during the continuous supply, between different ones of the plurality of lines in dependence upon transitions between a plurality of predefined fault-free operation phases, such that, during the continuous supply, each of the plurality of lines:
            carries the potential for the connection of the carried potential to the control unit in one or more respective ones of the predefined fault-free operation phases; and
            does not carry any of the potential during one or more other respective ones of the predefined fault-free operation phases.

6. The device according to claim 5, wherein an internal voltage supply to the control unit is connected to lines leading to the control unit.

7. The device according to claim 6, wherein every line is routed via a reverse-polarity protection device, located in the control unit, to the internal voltage supply of the control unit.

8. The device according to claim 6, wherein the control unit is connected to a data bus that switches on the control unit.

9. The device according to claim 8, wherein an energy accumulator is located between the internal voltage supply of the control unit and ground in order to switch on the control unit via the data bus.

10. The device according to claim 9, wherein the energy accumulator is a capacitor.

* * * * *